(12) United States Patent
Seligsohn et al.

(10) Patent No.: US 7,567,779 B2
(45) Date of Patent: *Jul. 28, 2009

(54) SUB-ORBITAL, HIGH ALTITUDE COMMUNICATIONS SYSTEM

(75) Inventors: Sherwin I. Seligsohn, Narberth, PA (US); Scott Seligsohn, Bala Cynwyd, PA (US)

(73) Assignee: International Multi-Media Corporation, Narbeth, PA (US)

( * ) Notice: Subject to any disclaimer, the term of this patent is extended or adjusted under 35 U.S.C. 154(b) by 128 days.

This patent is subject to a terminal disclaimer.

(21) Appl. No.: 11/228,144

(22) Filed: Sep. 16, 2005

(65) Prior Publication Data

US 2006/0063529 A1    Mar. 23, 2006

Related U.S. Application Data

(63) Continuation of application No. 10/180,217, filed on Jun. 25, 2002, now abandoned, which is a continuation of application No. 09/157,701, filed on Sep. 21, 1998, now abandoned, which is a continuation of application No. 08/591,532, filed as application No. PCT/US94/08059 on Jul. 22, 1994, now abandoned, which is a continuation-in-part of application No. 08/100,037, filed on Jul. 30, 1993, now abandoned.

(51) Int. Cl.
*H04B 7/185* (2006.01)
*H04W 4/00* (2009.01)

(52) U.S. Cl. .................. 455/12.1; 455/427; 370/316

(58) Field of Classification Search ............... 455/11.1, 455/12.1, 13.1, 427, 430, 431, 7; 244/32, 244/33, 169, 171, 3.14, 164, 3.19, 31; 342/2; 370/310, 315, 316
See application file for complete search history.

(56) References Cited

U.S. PATENT DOCUMENTS 651,361 A    6/1900   Kitsee (Continued)

FOREIGN PATENT DOCUMENTS

DE    1 923 744    11/1970

(Continued)

OTHER PUBLICATIONS

George Gilder, *From Wires to Waves*, Forbes ASAP, Jun. 5, 1995, pp. 125-141.

(Continued)

*Primary Examiner*—Quochien B Vuong
(74) *Attorney, Agent, or Firm*—Kenyon & Kenyon LLP

(57) ABSTRACT

A sub-orbital, high altitude communications system comprising at least two ground stations and at least one high altitude relay station. Each of the ground stations including means for sending and receiving telecommunications signals. The relay stations include means for receiving and sending telecommunications signals from and to said ground stations and from and to other relay stations. Means are provided for controlling the lateral and vertical movement of the relay stations so that a predetermined altitude and location of each of said relay stations can be achieved and maintained. Means are provided for receiving the relay stations so that they can be serviced for reuse.

196 Claims, 7 Drawing Sheets

U.S. PATENT DOCUMENTS

| | | | |
|---|---|---|---|
| 744,936 | A | 11/1903 | Plecher |
| 1,296,687 | A | 3/1919 | Nichols |
| 1,650,461 | A | 11/1927 | Nilson |
| 2,151,336 | A | 3/1939 | Scharlau |
| 2,462,102 | A | 2/1949 | Istvan |
| 2,542,823 | A | 2/1951 | Lyle |
| 2,598,064 | A | 5/1952 | Lindenblad |
| 2,626,348 | A | 1/1953 | Nobles |
| 2,627,021 | A | 1/1953 | Hansell et al. |
| 2,699,495 | A | 1/1955 | Magnuski et al. |
| 2,740,598 | A | 4/1956 | Van Krevelen |
| 2,748,266 | A | 5/1956 | Boyd |
| 2,886,263 | A | 5/1959 | Ferguson |
| 3,030,500 | A | 4/1962 | Katzin |
| 3,045,952 | A | 7/1962 | Underwood |
| 3,092,770 | A | 6/1963 | Shoemaker |
| 3,114,517 | A | 12/1963 | Brown et al. |
| 3,119,578 | A | 1/1964 | Borgeson et al. |
| 3,146,976 | A | 9/1964 | Houdou |
| 3,153,878 | A | 10/1964 | Smith, Jr. |
| 3,193,223 | A | 7/1965 | Davis |
| 3,260,017 | A | 7/1966 | Wolfe |
| 3,302,906 | A | 2/1967 | Winker |
| 3,390,851 | A | 7/1968 | Mann |
| 3,614,031 | A | 10/1971 | Demboski |
| 3,663,762 | A | 5/1972 | Joel, Jr. |
| 3,742,358 | A | 6/1973 | Cesaro |
| 3,746,282 | A | 7/1973 | Vorachek |
| 3,906,166 | A | 9/1975 | Cooper et al. |
| 3,971,454 | A | 7/1976 | Waterbury |
| 4,042,192 | A | 8/1977 | Walter |
| 4,073,516 | A | 2/1978 | Kling |
| 4,174,082 | A | 11/1979 | Eshoo |
| 4,204,656 | A | 5/1980 | Seward, III |
| 4,236,234 | A | 11/1980 | McDavid et al. |
| 4,262,864 | A | 4/1981 | Eshoo |
| 4,364,532 | A | 12/1982 | Stark |
| 4,368,415 | A | 1/1983 | Henderson et al. |
| 4,402,475 | A | 9/1983 | Pavlecka |
| 4,402,476 | A | 9/1983 | Wiederkehr |
| 4,440,366 | A | 4/1984 | Keeler et al. |
| 4,651,956 | A | 3/1987 | Winker et al. |
| 4,686,322 | A | 8/1987 | Kujas |
| 4,709,884 | A | 12/1987 | Gustafson |
| 4,711,416 | A | 12/1987 | Regipa |
| 4,729,750 | A | 3/1988 | Prusman |
| 4,928,317 | A | 5/1990 | Franchini |
| 4,931,028 | A | 6/1990 | Jaeger et al. |
| 4,955,562 | A | 9/1990 | Martin et al. |
| 4,986,494 | A | 1/1991 | Tockert |
| 4,995,572 | A | 2/1991 | Piasecki |
| 5,089,055 | A | 2/1992 | Nakamura |
| 5,149,015 | A | 9/1992 | Davis |
| 5,186,414 | A | 2/1993 | Holzschuh et al. |
| 5,186,418 | A | 2/1993 | Lauritsen |
| 5,206,882 | A | 4/1993 | Schloemer |
| 5,268,694 | A | 12/1993 | Jan et al. |
| 5,285,208 | A | 2/1994 | Bertiger et al. |
| 5,294,076 | A | 3/1994 | Colting |
| 5,379,320 | A | 1/1995 | Fernandes et al. |
| 5,386,953 | A | 2/1995 | Stuart |
| 5,448,623 | A | 9/1995 | Wiedeman et al. |
| 5,479,397 | A | 12/1995 | Lee |
| 5,519,761 | A | 5/1996 | Gilhousen |
| 5,559,865 | A | 9/1996 | Gilhousen |
| 5,678,783 | A | 10/1997 | Wong |
| 5,949,766 | A | 9/1999 | Ibanez-Meier et al. |
| 5,982,337 | A | 11/1999 | Newman et al. |
| 6,151,308 | A | 11/2000 | Ibanez-Meier et al. |
| 6,167,263 | A | 12/2000 | Campbell |
| 6,324,398 | B1 | 11/2001 | Lanzerotti et al. |
| 6,374,080 | B2 | 4/2002 | Uchida |
| 6,756,937 | B1 | 6/2004 | Chang et al. |
| 7,313,362 | B1 | 12/2007 | Sainct |

FOREIGN PATENT DOCUMENTS

| | | |
|---|---|---|
| DE | 40 09 772 | 10/1991 |
| EP | 0 119 841 | 9/1984 |
| EP | 0 371 529 | 6/1990 |
| EP | 0 536 921 | 4/1993 |
| EP | 0 639 035 | 2/1995 |
| FR | 2 077 798 | 10/1973 |
| FR | 2 282 366 | 3/1976 |
| FR | 2 408 228 | 1/1979 |
| FR | 2 539 383 | 5/1985 |
| FR | 2 561 719 | 9/1985 |
| FR | 2 622 754 | 5/1989 |
| FR | 2 669 455 | 5/1992 |
| FR | 2 673 418 | 9/1992 |
| GB | 2 027 403 | 2/1980 |
| GB | 2 051 247 | 1/1981 |
| GB | 1 591 902 | 7/1981 |
| GB | 2082995 | 3/1982 |
| GB | 2137051 | 9/1984 |
| GB | 2196919 | 5/1988 |
| GB | 2 281 014 | 2/1995 |
| JP | 51 6609 | 1/1976 |
| JP | 53 148907 | 12/1978 |
| JP | 1 180129 | 7/1988 |
| JP | 3 104426 | 5/1991 |
| JP | 4 286975 | 10/1992 |
| JP | 4 355522 | 12/1992 |
| JP | 5 063829 | 3/1993 |
| JP | 6 104865 | 4/1994 |
| JP | 4 96528 | 11/1996 |
| PL | 38345 | 10/1955 |
| WO | WO 95/10145 | 4/1995 |
| WO | WO 97/07609 | 2/1997 |
| WO | WO 97/15992 | 5/1997 |
| WO | WO 97/33790 | 9/1997 |
| WO | WO 97/34449 | 9/1997 |
| WO | WO 98/51568 | 11/1998 |

OTHER PUBLICATIONS

Mark Dzlatklewics, *Smart Antennas Transmitt Savings*. Jan. 15, 1995, pp. 83-84.

Found on the Internet: http://mathworld.com/StandardDeviation.html, *Probability and Statistics*, May 28, 2003, pp. 1-12.

Found on the Internet: http://www.spirentcom.com/documents/159.pdf, *Emulating RF Channel Characteristics*, May 27, 2003, pp. 1-10.

Found on the Internet: http://www.tpub.com/neets/book11/46c.htm, *Antenna Arrays*, May 27, 2003, pp. 1-7 and 1-2.

Found on the Internet: http://www.ee.surrey.ac.uk/Personal/D.Jefferies/pantarray.html, *Antenna Arrays*, May 27, 2003, pp. 1-12.

Brown et al., *Balloon Technology Offers High-Altitude Applications*, Aviation Week & Space Technology, Nov. 16, 1992, pp. 56-57 (translation provided).

Found On the Internet: http://www.electronicstimes.com/story/OEG20030408S0042, *Intel Helps Found WiMAX Broadband Wireless Forum*, Semiconductor Business News, Apr. 8, 2003.

Dr. Philip C. Koenig, Communications, Surveillance, and Cargo: *Some Current Directions and Programs in Airship Design and Development*, Office of Naval Research Int'l Field Office, Aug. 21, 2001, pp. 1-2.

*Airships to Complement Satellite and Terrestrial Systems*, ESA Press Release, Mar. 10, 2003, pp. 1-2.

Mark Long, *Wi-Fi Heads for the Stratosphere*, Nov. 25, 2002.

Found on the Internet: http://skvstation.com/presentation/Regulatory/sld003.htm, *Initial ITU Activities*, Regulatory Affairs [International], Mar. 7, 2003.

Found on the Internet: http://www.wired.com.news.wireless 0.1382,56961,00.html, *Bird? Plane? UFO? No, Stratellite*, 2003 Associated Press, pp. 1-3.

Found on the Internet: http://msnbc.com/news/891861, *DOD Turns to Commercial Satelllites*, Technology & Science, Mar. 27, 2003.
Naguib et al., *Capacity Improvement of Base-Station Antenna Arrays Cellular CDMA*, 1993 IEEE, pp. 1437-1441.
Dr. Joseph Pelton, *Space Segment Technologies for the 21$^{st}$ Century: Key Challenges for National Satellite Systems*, 1991 IEEE, pp. 1103-1107.
Wu et al., *A Broadband Wireless Access System Using Stratospheric Platforms*, 2000 IEEE Global Telecomunications Conference, pp. 225-230.
Winters, Jack H., "Signal Acquisition and Tracking with Adaptive Arrays in Wireless Systems," IEEE, pp. 85-88 (May 18, 1993).
http://www.geo-orbit.org/sizepgs/geodef.html, "Geostationary, LEO, MEO, HEO Orbits Including Polar and Sun-Synchronous Orbits with Example Systems and a Brief Section on Satellite History," May 27, 2008.
Kary, Tiffany, "Motorola Settles Iridium Unit's Creditor Claims (Update 5)," Bloomberg.com, Apr. 23, 2008.
Hesseldahl, Arik, "The Return Of Iridium, " Forbes.com, Nov. 30, 2001.
Hua, Vanessa, "Globalstar Hangs On In Satellite Wireless," p. C-9 of the San Francisco Chronicle, Mar. 9, 2001.
http://en.wikipedia.org/wiki/Globalstar, Globalstar, May 27, 2008.
Gilder, G., *George Gilder's Telecosm*—The New Rule of Wireless, Forbes ASAP, 1993, pp. 96-109.
Gilder, G., *George Gilder's Telecosm* Auctioning the Airways, Forbes ASAP, Apr. 11, 1994, pp. 99-112.
Gilder, G., From Wires to Waves, Forbes ASAP, Jun. 5, 1995, pp. 125-141.
Calhoun, G., *Digital Cellular Radio*, Artech House Inc. 1988, pp. 276-360 & 373-374.
Calhoun, G., *Wireless Access and the Local Telephone network*, Artech House Inc. 1992, pp. 334-340.
Steele et al., Third Generation PCN and the Intelligent Multimode Mobile Portable, Jun. 19, 1993, pp. 147-152, Electronics Communication Engineering Journal.
Steele, "Mobile communication in the 21st century," Communications after AD2000 (1993), pp. 135-147.
Arndt G.D. et al., "Application of beam power technology to a space station," The National Telesystems Conference, IEEE Catalog #82CH1824-2, Nov. 7-10, 1982, pp. B2,4.1-B2.4.5.
Fulghum, "Helos, Aerostats to Push Meads Range," Aviation Week & Space Technology, Nov. 27, 1995.
Fulghum, "Balloons Studied for Intelligence Role," Aviation Week & Space Technology, Nov, 27, 1995, pp. 24-25.
Balloon and airship; excepted from Compton's Interactive Encyclopedia, copyright 1993, 1994.
Dane, "A New Balloon", Popular Mechanics; Feb. 1993; p. 106 (2 pages).
"Secret Message by Satellite," Popular Mechanics, Mar. 1993, p. 16.
Wilson, J., "Countdown Begins for Earth-Orbiting Balloons," Popular Mechanics, May 1997, p. 19.
Brown, D.A., "The Birth of Iridium," Popular Science, Mar. 1994, p. 63.
Mowry, "Blimps go head-to-head with satellites?," Satellite Communications (1988) p. 70.
Poe, "Sanswire 'Stratellite' positioned as wireless alternative," America's Network (May 2005), p. 18.
"Blue skies for broadband," Popular Science (Mar. 2005), p. 30.
"Hughes may have to build inmarsat-p birds around odyssey patents," Mobile satellite news (Jul. 27, 1995), pp. 1-3.
Pelton, "Telecommunications for the 21$^{st}$ Century," Scientific American (Apr. 1998), pp. 68-73.
www.aeroenvironment.com/area-aircraft/unmanned.html (Aug. 8, 1998), "Unmanned air vehicles", pp. 1-2.
www.abcnews.com (Aug. 8, 1998),"New altitude record for prop plane," pp. 1-2.
"Who's who and what's happening," Forbes ASAP, pp. 139-141.
www.skystation.com, Launching the sky station platform.
HAPS—High Altitude Platform Stations, pp. 1-10.
Windle, "Airship is down-to-earth alternatives to satellites," The Sunday Times: Innovation (May 24, 1999), pp. 1-3.
Fulghum et al., "Air force prepares new UAV acquisitions, operations," Aviation week and space technology (Nov. 27, 1995) , pp. 52-54.
www.phillynews.com/inquirer/96/Oct/10/lifestyle/SATS10.html (Oct. 10, 1996), "An essential protocol known as TCP is keeping the Internet tied to Earth," pp. 1-2.
www.phillynews.com/tech.life/DUDE10.htm, "Satellites may speed links to Internet," pp. 1-2.
www.hotwired.com/wired_online/4.09/skystation/index.html, "Space Case," Sep. 29, 1996, pp. 1-2.
www.hotwired.com/wired/4.09/es.sky.html, Electrosphere, "Space Case" Sep. 29, 1996, pp. 1-5.
www.cnn.com, "Solar-powered plane scrapes the edge of space," Aug. 7, 1998, pp. 1-3.
Ashley, "The rupture of Earth's ozone shield has become a global concern. But how can scientists gain the high-altitude data they need to find solutions? This unmanned power glider might be the answer," Popular Science (Jul. 1992), pp. 60-64.
Scott, "Relay aircraft enable cell 'Network in the Sky,'" pp. 22-23, Aviation Week & Space Technology (Jun. 29, 1998)
"International Balloon Federation," NY Times Article (Jun. 7, 1994), p. 1.
Browne, "Balloon teams vie to be first around world" The New York Times (Jun. 7, 1994).
"Perseus Prototype Flies," (Popular Mechanics Mar. 1992), p. 14.
"Powerbeamed drone aims for the stratosphere," Popular Mechanics (Apr. 1992), p. 21.
www.geo.arc.nasa.gov/ERAST/pathfinder/index.html, "Pathfinder" (Aug. 8, 1998).
Brayer, "Packet switching for mobile earth stations via low-orbit satellite network," Nov. 1994, vol. 72, No. 11, Proceedings of the IEEE.
Golden, "Exploring space on the cheap," Time (Nov. 23, 1998).
Brown, "The eternal airplane," Popular Science (Apr. 1994).
Hardy, "Highflying angel sees market in the sky for delivering data," The wall street journal interactive edition (Dec. 24, 1997), pp. 1-4.
"From mother to daughter: 832 watts," Popular Science (Oct. 1993), p. 26.
"Huge balloon proposed to launch astronomy instruments," CNN Interactive (Dec. 22, 1997), pp. 1-4.
"Superpressure balloon material selection process," Winzen, pp. 1-3.
"Superpressure stratospheric vehicle test and development," Winzen, pp. 1-7.
Application of sky station international, Inc. for authority to construct deploy and operate a global stratospheric telecomunications system, Before the Federal Communications Commission, Mar. 20, 1996.
"Sky station moblie broadband communications at 2GHz," pp. 1-2, Sky Station International Inc. (Jul. 9, 1998).
www.skystation.com/service.html, "Telecommunication Service Characteristics," Sky Station International Inc. (Oct. 1, 1998), pp. 1-2.
"Sky station broadband communications at 47GHz," Sky Station International Inc. (Jul. 9, 1998), pp. 1-2.
"Sky station Africa," Sky Station International Inc. Jul. 1998.
"Sky station platform technical summary," Sky Station International Inc. (Jul. 2, 1998), pp. 1-3.
www.skystation.com/faq/index.html, "Frequently Asked Questions," Sky Station International Inc., pp. 1-3.
www.skystation.com/sts.html, "The Technology: Stratospheric Telecommunications service," Sky Station International Inc., pp. 1-2.
"The Stratosphere," Sky Station International Inc. (Jul. 22, 1998), pp. 1-2.
"The Future of Communications is Up in the Air . . . Where it Belongs," Sky Station International Inc. (Jun. 1, 1998), pp. 1-6.
www.skystation.com/telecomreports.html, "Press Release," Sky Station International Inc. (Mar. 31, 1998), pp. 1-3.
www.telecomn.com/english/china/PS5_20001.htm, Youshou, "Prospects for future stratospheric communications system," Feb. 5, 2001.
Letter from Wizen International to Sherwin I. Seligsohn, dated Sep. 13, 1993 enclosing Final report dated Jun. 11, 1993.
Poe, "Drag coefficient for streamlined bodies, etc.," Nov. 4, 1996.
Lory, "Hi-Spot, Conceptual Design Study Final Report,", Lockheed Missiles & Space Company, Inc. (Mar. 1982), pp. 1-73.

SUB-ORBITAL, HIGH ALTITUDE COMMUNICATIONS SYSTEM

CROSS REFERENCE TO RELATED APPLICATIONS

This application is a continuation of prior U.S. application Ser. No. 10/180,217 filed Jun. 25, 2002, now abandoned which is a continuation of prior U.S. application Ser. No. 09/157,701 filed Sep. 21, 1998 (now abandoned), which is a continuation of prior U.S. application Ser. No. 08/591,532, filed Aug. 26, 1996 (now abandoned), which claims the benefit as a national stage application of PCT/US94/08059, filed Jul. 22, 1994, which is a continuation-in-part of prior U.S. application Ser. No. 08/100,037 filed Jul. 30, 1993 (now abandoned), incorporated herein by reference.

FIELD OF THE INVENTION

This invention relates to a long duration, high altitude communication system, and more particularly to a communications system in a sub-orbital plane that is well above any system which is physically connected to the ground, and whose components can stay aloft and on station for long periods.

BACKGROUND OF THE INVENTION

Wireless telecommunications systems currently use either terrestrial (ground) based infrastructures or space (satellite) based infrastructures. Terrestrial based systems include radio towers and antennae on tall buildings, mountains, and the like. Also, balloons that are tethered to the ground have been used. Spaced based systems rely on satellites having telecommunications equipment.

Terrestrial based wireless telecommunications systems have been known since the early days of radio, almost a hundred years ago. Their configurations range from simple one-way and two-way radio hookups—to radio and television broadcast networks—to today's sophisticated cellular networks and proposed personal communications networks (PCN).

"Relay stations" are used to send and receive radio transmissions to and from other locations. Because they are on or close to the ground, their radio signals tend on the average to be closer to the horizontal than the vertical. Thus, each relay station can only send and receive signals from a limited distance. The distance that the radio signals can travel is limited because of horizon problems due to the curvature of the earth; line of sight problems due to uneven terrain, trees, and buildings; interference due to other signals or with reflections of the transmitted signal; and attenuation problems due to unwanted absorption of the transmitted signal. To increase the area of coverage, either more powerful equipment must be used, and/or the height of the relay stations must be increased. Increasing power helps to solve the attenuation problem and the interference with other signals problem; but it does not address the horizion, line-of-sight, and interference with relected signal problems. Therefore, it is preferred to increse the height of the relay stations as by putting them on towers, tall buildings and mountain tops. This rolls back the horizon and line-of-sight for the relay station thereby increasing the area that it can cover, and to some extent reduces the attenuation problem and the interference with the reflected signal problem. However, it is not always feasible to place relay stations at optimum locations due to geographic or political factors, or merely because of the inability to obtain permission from a land owner or government.

To some extent these problems are alleviated by wireless telecommunications equipment carried by tethered balloons. However, tethered balloons have their own problems. If the balloons are tethered at low altitudes, their area of coverage will not be any larger than that of a relay station on a tower or tall building making it difficult to justify their cost. Also, since they will be subject to the weather and wind conditions that exist at these altitudes, they are likely to be easily damaged and require frequent replacement.

On the other hand, if they are tethered at altitudes that enable them to relay telecommunications signals over a large enough area to make them economically feasible and to avoid weather conditions, thereby prolonging their life, both the balloons and tethers become hazardous to aircraft and the tethers remain subject to the stress of weather conditions.

Further, it is likely that the tether of a failed balloon will be strewn along hundreds if not thousands or tens of thousands of feet causing damage and risk of injury to property and persons. Additionally, if the tether falls across electric lines there is a risk of fire and power outages.

Accordingly, these disadvantages make tethered ballons unsuitable for use as part of a telecommunications system whose components are to operate for long periods.

To overcome many of the limitations of ground based wireless telecommunications systems, orbital space based telecommunications systems have been constructed using satellite technologies which have evolved since the first days of Sputnik (1957). Satellite systems in geosynchronous orbit (approximately 22,000 miles) have been used for may years with a high degree of reliability. Their prime advantage is their high altitude which enables one satellite to send and receive signals from an area on the earth encompassing hundreds of thousands of square miles. However, satellites are expensive to manufacture, launch and position, either initially or as replacements. Further, because of the cost associated with their manufacture and launch, and the great difficulty in servicing them, extraordinary care must be taken to assure their reliability.

Moreover, because of a satellite's high altitude, there is a delay in radio transmission of about ⅛ of a second in each direction. This significantly limits the satellite's ability to carry and conduct familiar two way (duplex) voice communications. Also, due to its high altitude, its radio transmission equipment requires more power than required by comparable terrestrial systems. This raises costs and affects the size and weight of equipment both on the satellite and on the ground.

When a satellite fails, as assuredly they all must do, either electronically, or by decay of orbit, attempts to recover or repair them are extremely expensive. Further, the attempts, whether or not successful, subject personnel and equipment to the risk of injury or loss. On the other hand, a failed satellite may be left in orbit. It will be another piece of "space junk," until its orbit decays to the extent that it plunges through the atmosphere toward earth. If it is not fully consumed during the plunge, it may cause damage to persons or property when it strikes the earth.

In an attempt to solve the problems attendant to existing high altitude satellite systems, it has been proposed to orbit the satellites at an altitude of either about 500 miles or at about 5,000 miles. While this will reduce power requirements and transmission delay times, it creates other problems. This is because at these lower altitudes the satellites are not geosynchronous. Therefore, telecommunications signals may be required to be transmitted between several satellites during a particular communication. This is because the circumferential position of each satellite relative to the earth is continuously changing. Therefore, a particular satellite that is over a ground station at the beginning of a communication may orbit to such an extent during the communication that it loses the signal from the ground. To maintain the connection, the signal from the ground will have to be transferred to another satellite that is closer to the ground station. Also, the satellites will have to be programmed to permit this to happen. Thus, very complex routing features will need to be implemented. In addition, members of the industry disagree amongst themselves over optimum altitudes, angles of signal propagation, and how to deal with the doppler shifts. Furthermore, because of their lower altitude, the satellites' orbits will decay at faster rates than the higher altitude satellites so that they and the equipment they carry will need to be replaced more often, again incurring substantial expense.

The problems described could be substantially reduced by a telecommunications infrastructure using long duration, high altitude, recoverable telecommunications stations that can be kept on station and which are located in a sub-orbital plane, and which have the ability to receive telecommunication signals from a ground station and relay them to another similar station or to a further ground station.

Since the propagation of radio signals to and from the relay stations would be nearly vertical; line of sight, reflective interference and attenuation problems would be minimized. This is because there would be less liklihood of tall buildings, trees or terrain to block, relect, or absorb the radio signals. This means that less power would be needed to send a signal a given distance than if it were transmitted horizontally at or near the ground. Further, because the system would operate at altitudes that are less than ten percent of the lowest proposed satellite systems, less power would be required for telecommunications signals with no noticable delay in transmission.

This will create a means for providing relatively low cost, efficient, wireless telecommunications without incurring the economic and physical limitations associated with terrestrial based network infrastructures, tethered balloon systems or orbiting space based network infrastructures.

SUMMARY OF THE INVENTION

Accordingly, with the foregoing in mind the invention relates generally to a telecommunications system that comprises at least two ground stations. Each of the ground stations includes means for sending and means for receiving telecommunication signals. At least one relay station is provided. The relay station includes means for receiving and sending telecommunication signals from and to the ground stations and from and to other relay stations.

The relay stations are at an altitude of about 12 to 35 miles. Means are provided for controlling the lateral movement of the relay stations so that once a pre-determined altitude is reached, a predetermined location of each of the relay stations can be achieved and maintained.

In another aspect the invention relates to a telecommunications method comprising the steps of providing at lease two ground stations and at least one relay station. One of the relay stations is positioned at a predetermined location and at an altitude of about 12 to 35 miles. A telecommunications signal is transmitted from one of the ground stations to one of the relay stations. The relay station then transmits the telecommunications signal to the second ground station or to at least another of the relay stations and then to the second ground station. Each of the relay stations is maintained at a predetermined altitude and location.

In still another aspect the invention relates to a relay station for a high altitude sub-orbital telecommunications system. It includes means for receiving and sending telecommunications signals from and to ground stations and/or from and to other relay stations. It also includes means for controlling the lateral and vertical movement of said relay station so that a predetermined altitude and location for the relay station can be achieved and maintained.

DESCRIPTION OF THE DRAWING

The invention can be further understood by referring to the accompanying drawing of a presently preferred form thereof, and wherein.

DESCRIPTION OF A PREFERRED EMBODIMENT

Figure 1:
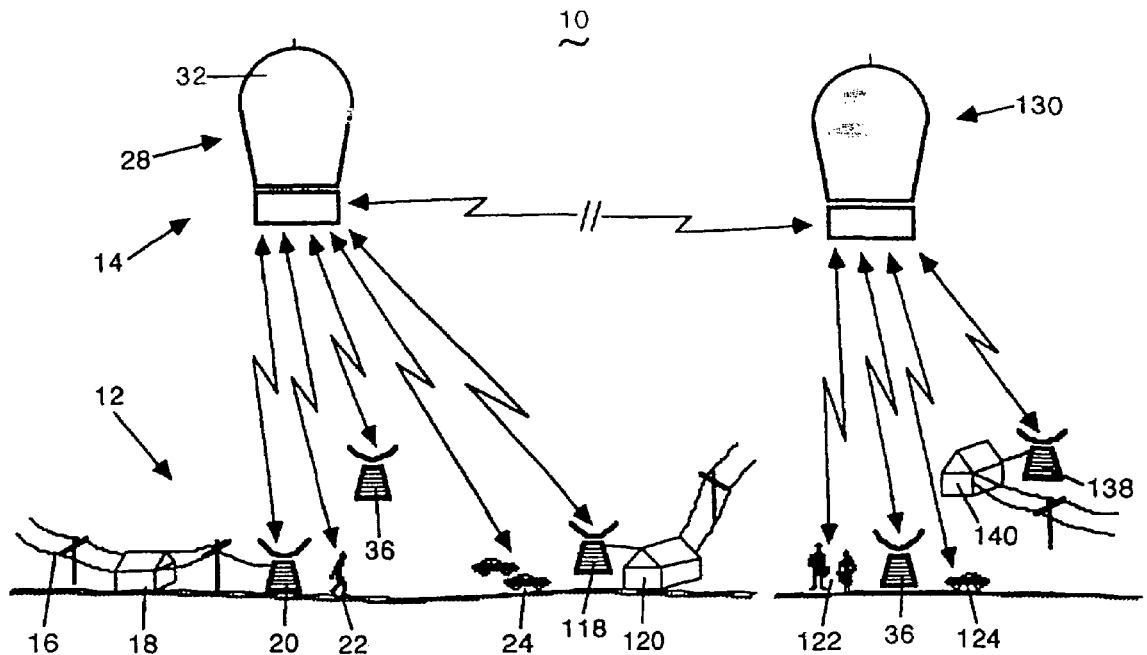
FIG. 1 is a schematic showing a communications system constructed in accordance with a presently preferred form of the invention.

Referring now to FIG. 1, the system 10 comprises a ground based portion 12 and an air based portion 14.

The ground based portion 12 may comprise conventional telephone networks 16 with branches that are connected to a ground station 18 having suitable long distance transmitting and receiving means such as antenna 20. The ground based portion 12 may also comprise mobile telephones of well known types such as cellular telephones that may be carried by individuals 22 or in vehicles 24. The microwave antennae 20 are operative to transmit and receive telecommunication signals to and from a sub-orbital, high altitude relay station 28 which is located at an altitude of between about 12 to 35 miles.

Preferably, there are a plurality of relay stations 28; each one being on station at a fixed location over the earth. As presently preferred, the relay stations are designed to stay aloft and on station at least 20 to 30 days.

Each relay station 28 contains means for receiving telecommunication signals from a ground station 20, individual 22 or vehicle 24 and then transmitting them to another ground station 118, individual 122 or vehicle 124 either directly or by way of another relay station 130. Once the signals return to the ground based portion 12 of the system 10, the telecommunication calls are completed in a conventional manner.

The relay station 28 may comprise a lifting device 32.

While ordinary zero pressure balloons have been considered as suitable lifting devices for high altitude flights, they are not suitable for systems that must operate for periods longer than about a week or ten days. This is because as the gas in a zero pressure balloon cools each night, its density increases. As a result, it descends until it reaches a density altitude that is equal to its own density. Therefore, to remain aloft the zero pressure balloon must drop about 8-9% of its weight each night to compensate for its increased density or it may strike the earth.

A suitable lifting device could be an inflatable, lighter than air device such as a high altitude super-pressure balloon of the type developed by Winzen International, Inc. of San Antonio, Tex. The super-pressure balloon 32 is configured so that it floats at a predetermined density altitude. The configuring is accomplished by balancing inflation pressure of the balloon and the weight of its payload against the expected air pressure and ambient temperatures at the desired density altitude. It has been observed that devices of this character maintain a high degree of vertical stability during the diurnal is passage notwithstanding that they are subject to high degrees of temperature fluctuation.

In the alternative the lifting device 32 could be an improved zero pressure balloon of the type having means for controlling the extent to which the gas inside the balloon is heated during the day and is cooled at night. Thus, controlling the heat of the gas reduces the amount of ballast that will need to be dropped each night.

As a further alternative, the lifting device 32 could be an overpressure zero pressure balloon. This is a conventional zero pressure balloon that is modified by closing its vents. It is allowed to pressurize within established limits in flight by the controlled release of gas through a valve. This reduces the amount of ballast that must be dropped when the gas cools at night as when a conventional zero pressure balloon would increase in density and lose altitude.

While the overpressure zero pressure balloon still experiences diurnal altitude changes, it requires significantly less ballast and gas loss than the zero pressure balloon with the heat control. Therefore, flight time and payload may be substantially greater than for zero pressure balloons. However, the expansion and contraction of the gas inside the balloon during a twenty-four hour period that accompany altitude changes places enormous stress on it so that the payload that it carries is reduced.

Therefore, it is desirable to control the altitude of the balloon and the expansion and contraction of the gases inside it so that the stresses on it are reduced. This can be accomplished by using a means for controlling the amount that the gas inside the balloon is heated during the day and is cooled at night. Thus, to the extent that the stress on the balloon can be controlled, payloads of up to three to four tons can be carried for relatively long periods.

The amount of heat inside the balloon can be controlled by making the skin of the balloon, or portions of the skin, from a suitable transparent, electro-chromatic or photo-chromatic material. Thus, the balloon skin will be substantially transparent at low light levels and at night. This will permit radiant heat energy to enter the balloon and heat its interior in a manner similar to a greenhouse. During the day, sunlight or a signal sent from the ground will cause the skin to become reflective or opaque. This will reduce the amount of radiant energy that will enter the balloon, thereby keeping the interior of the balloon relatively cool.

Another way to control altitude is to use a balloon that includes a central expansible chamber that is filled with a lighter that air gas that is surrounded by an outer substantially non-expansible chamber that is filled with air. To reduce altitude, compressed air is forced into the outer chamber; to increase altitude, air is vented from the outer chamber. Typical of this system is the odyssey balloon project of Albuquerque, N. Mex. and described in the New York Times of Jun. 7, 1994, at section C, page 1.

A plurality of tracking stations 36 are provided. They include well known means which can identify a particular relay station 28 without regard to whether it is in a cluster and detect its location and altitude.

As will be explained, a thrust system is provided for returning a relay station 28 to its preassigned station should a tracking station 36 detect that it has shifted. The thrust system can be operated automatically to keep the relay stations on station by using control systems that rely on fuzzy logic.

Figure 2:
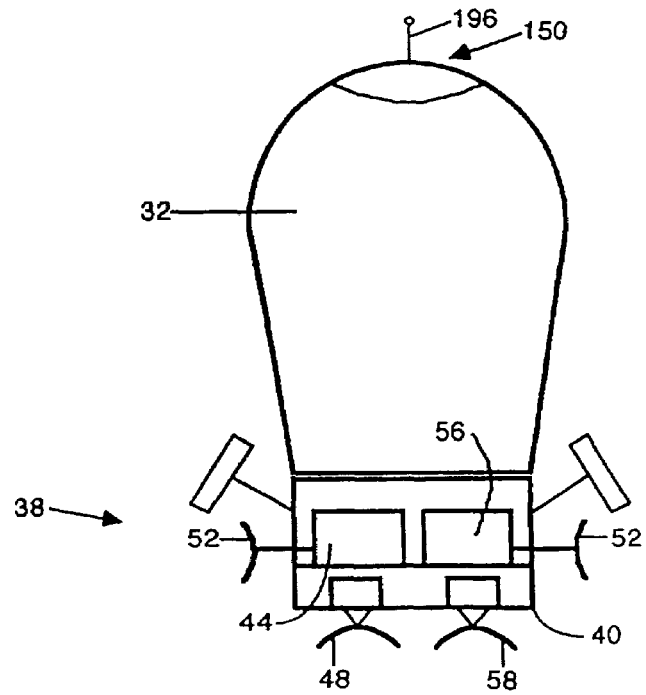
FIG. 2 is a elevation view of one of the relay stations comprising the invention.

Referring to FIG. 2, it can be seen that each of the relay stations 28 comprises one equipment module 38. In a presently preferred form of the invention, the equipment module comprises a platform. However, the equipment module 38 can be of any convenient shape and size that is sufficient to support the equipment necessary to accomplish the purpose of the relay station.

Figure 3:
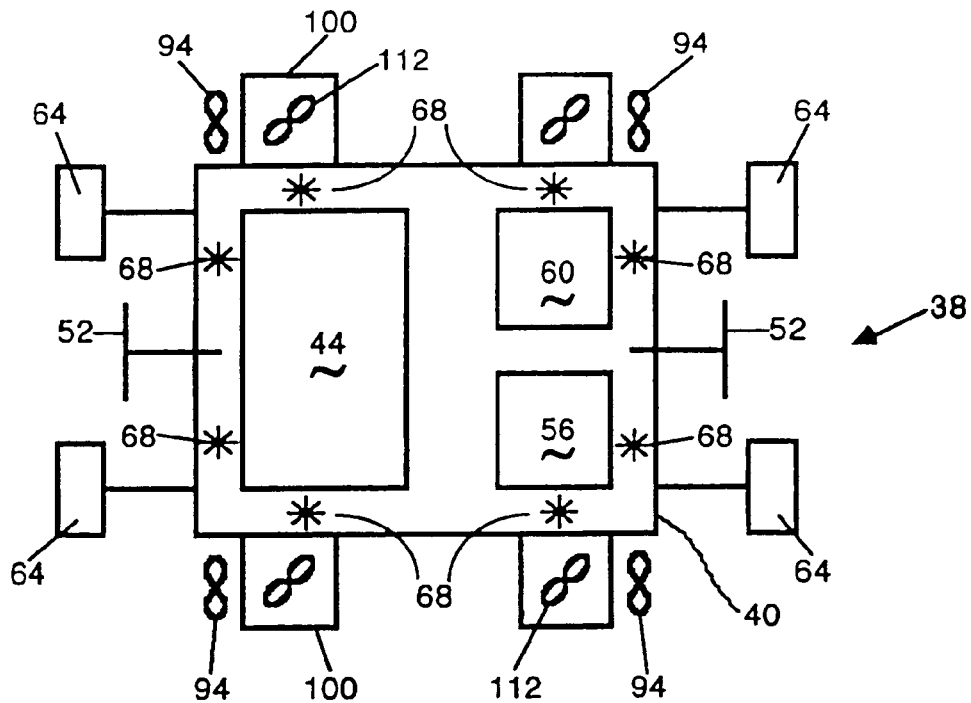
FIG. 3 is a view of a portion of FIG. 2 showing a propulsion system.

As seen in FIGS. 2 and 3 the equipment module 38 includes a housing 40 which is supported by device 32. The housing 40 contains a telecommunication signal transmitter and receiver 44 and a ground link antenna 48. Antenna 48 is for receiving and sending telecommunications signals between ground stations 20 and the relay station 28. The relay station 28 also includes a plurality of antennas 52 which are adapted to receive and transmit telecommunications signals from and to other relay stations. The housing 40 also contains a guidance module 56 that transmits the identity and location of the relay station to the tracking stations 36. It receives instructions from the tracking station for energizing the thrust system. A guidance antenna 58 is provided to enable communication between the tracking station 36 and the guidance module 56.

A suitable re-energizable power supply 60 is mounted on housing 40, the power supply 60 may comprise a plurality of solar panels 64. In a well known manner the solar panels capture the sun's light and convert it into electricity which can be used by the telecommunications equipment as well as for guidance and propulsion.

In addition the power supply could also comprise a plurality of wind vanes 68. The wind vanes may be arranged to face in different directions so that at least some of them are always facing the prevailing winds. The wind vanes 68 can be used to generate electric power in a well known manner which also can be used by the telecommunication equipment as well as for guidance and propulsion.

Figure 4:
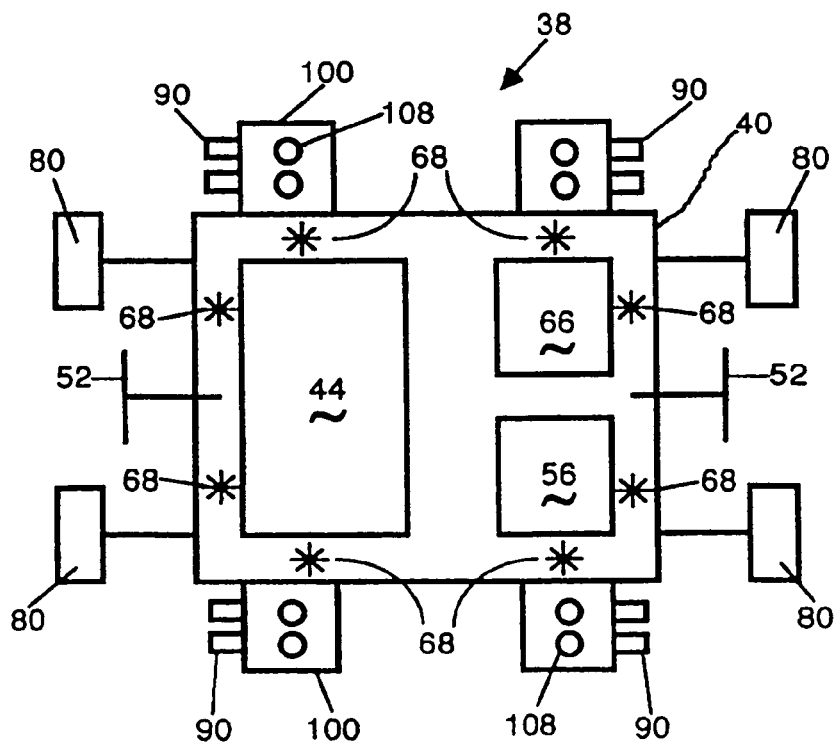
FIG. 4 is a view of a portion of FIG. 2 showing another form of propulsion system.

As seen in FIG. 4, an alternate power supply 66 may be provided in the form of a microwave energy system similar to that which has been developed by Endosat, Inc. of Rockville, Md. The microwave energy system includes a ground based microwave generator (not shown) that creates a microwave energy beam of about 35 GHz. This beam is directed to receptors 80 on the relay station 28 and there converted to direct current. Further, the microwave energy could come from a source that is in orbit or from free space.

In a manner similar to the solar energy system, the microwave energy system could supply power sufficient to operate the telecommunications system on the relay station as well as provide power for guidance and propulsion.

Further, the relay stations 28 may be provided with at least one microwave transmitter and suitable means for aiming the microwave transmitter at a microwave receiving means on another relay station 28 so that a source other than the ground based microwave generator is available to provide microwave energy to the relay stations.

As seen in FIGS. 3 and 4 the thrust system for the relay station 28 may comprise a plurality of rockets or jets 90 or propellers 94. The jets 90 and propellers 94 are arranged in a horizontal plane along mutually perpendicular axes which are supported by pods 100 on the housing 40. By selective energization of various ones of the jets or propellers the relay station 28 can be directed to and maintained at a pre-determined location over the earth.

If desired, additional jets or rockets 108 or propellers 112 could be located on vertical axes to assist in bringing the relay station to its pre-determined altitude on launch or restoring it should its drift from that altitude be more than an acceptable amount.

Drifting of the relay stations 28 from their pre-determined locations will be detected by the tracking stations 36. The tracking stations 36 will then energize the thrust members on the relay stations 28 for selected intervals to return them to their pre-determined locations.

Figure 5A:
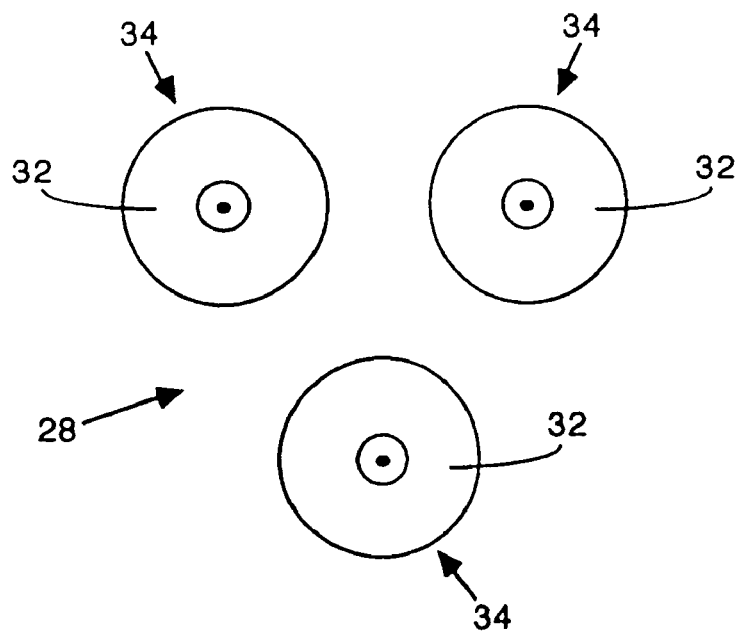
FIGS. 5A and 5B are a plan view and an elevation view, respectively, of another form of a part of the invention shown in FIG. 2.
Figure 5B:
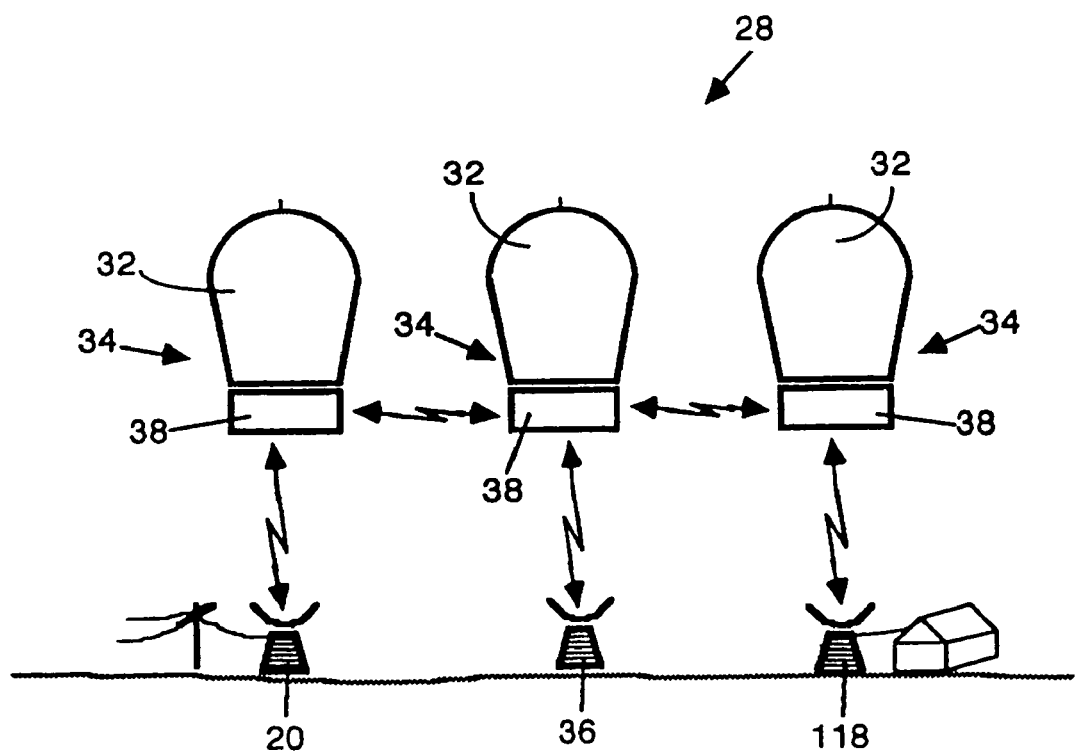

As an alternative, as seen in FIGS. 5A and 5B each relay station 28 can comprise a cluster of between two and four sections 34. Each section 34 comprises an equipment module 38 that is independently carried by its own lifting device 32.

Some of the equipment modules 38 can carry telecommunications equipment while other equipment modules 38 can carry power generation and transmitting equipment. Thus, energy can be transmitted from the power generation modules by beaming microwave energy to antennae on the communications modules. Since there are several sections 34 comprising a relay station, each section 34 can be smaller and lighter than if there were only one equipment module comprising the relay station 28. Further, the provision of a cluster of sections 34 creates a redundancy that will keep the relay station in service should the equipment on one of the sections 34 fail.

Figure 6A:
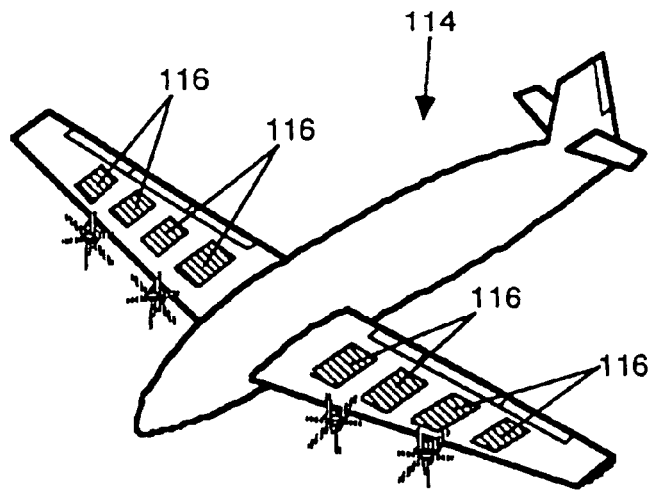
FIG. 6A, 6B and 6C are views of further forms of a part of the invention shown in FIG. 2.
Figure 6B:
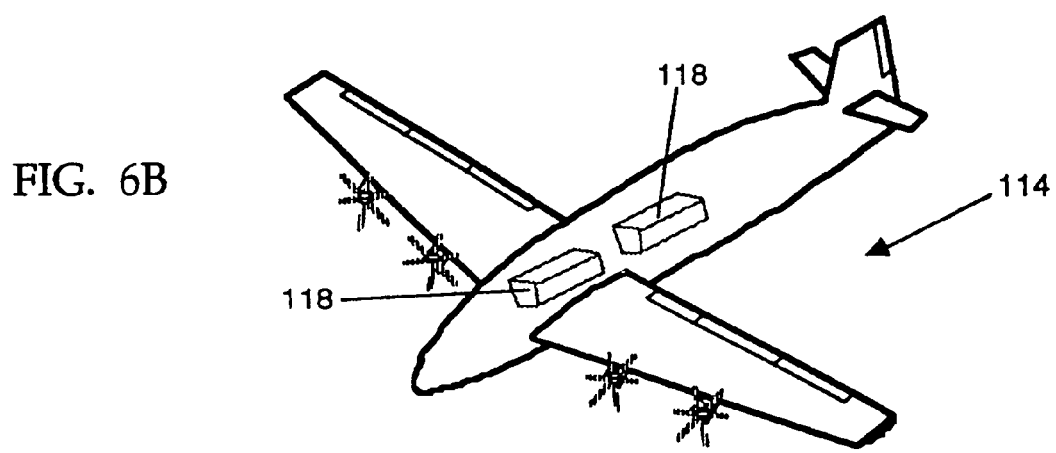
Figure 6C:
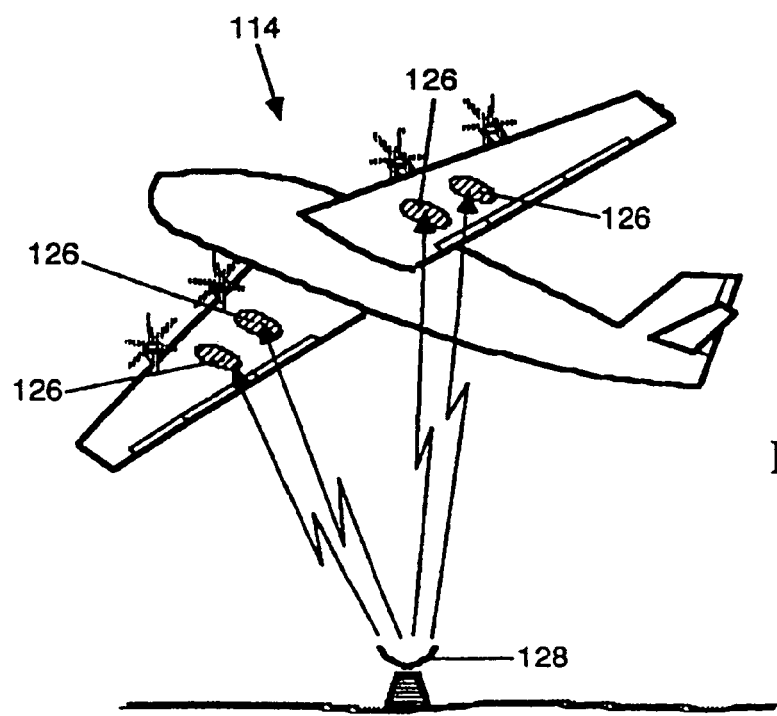

As another alternative, as seen in FIGS. 6A, 6B and 6C, lightweight, unmanned airplanes 114 could be used in lieu of the balloons. The airplanes 114 could be controlled from the ground in a well known manner. However, they are less desirable than balloons. This is because they are constantly changing position to remain aloft, and because their payloads are limited by the lightweight airframes required to reach high altitudes.

As seen in FIG. 6A power to maintain the airplanes 114 aloft for long periods could be achieved by using solar power. In this instance the airplane could be essentially a flying wing that is comprised of high efficiency solar panels 116. The solar panels in the wing could drive electric motors and an energy storage system.

Additionally, as seen in FIG. 6B hydrogen—oxygen regenerative fuel cells 118 could be used to achieve long periods of flight.

Further, as seen in FIG. 6C the lightweight airplane 114 could achieve its power from microwave energy that is beamed to antennae 126 on the airplane from a transmitting dish 128 on the ground as described above, or is collected from microwave energy in free space.

When the system 10 is operating the customer will be unaware of its existence. Thus, when a call is placed, the telecommunications signal will be conveyed from the caller's telephone by way of a conventional network to the ground station 18 associated with that location. The microwave antenna 20 will then beam a telecommunications signal corresponding to that telephone call to the nearest relay station 28. Switching circuity of a well known type will direct the signal to another ground station 120 near the recipient. If the recipient is further, the signal will be sent to a further relay station 130 from which it will be directed to a mobile telephone carried by an individual 122 or in a vehicle 124 or to a ground station 140 near the recipient. The signal received by the ground station 120 or 140 will be transmitted to the recipient's telephone by way of a conventional telephone network. Once a communication link is established between two telephones by way of the ground stations and relay stations, the parties can communicate.

Since the relay stations are at an altitude of about 12-35 miles they are above adverse weather. None-the-less, at that altitude telecommunications power requirements are low enough to enable the use of frequencies that are the same as those used for terrestrial transmission. This means that existing allocated telecommunications frequencies can be used. Since much of the engineering has been done for those telecommunications frequencies, the costs of implementing this system are reduced. Further, maximum use of the existing frequencies can be achieved by currently known digital multiple access technologies such as frequency division multiple access (FDMA), time division multiple access (TDMA), code division multiple access (CDMA) or combinations of them.

Therefore, by comparison to telecommunications signals from satellites, the signals generated in the communications system of the invention can be relatively weak since they travel a shorter distance. This is particularly advantageous since the ability to use a weaker signal results in transmitters and receivers that are smaller, lighter, and which require less power to operate.

Figure 7A:
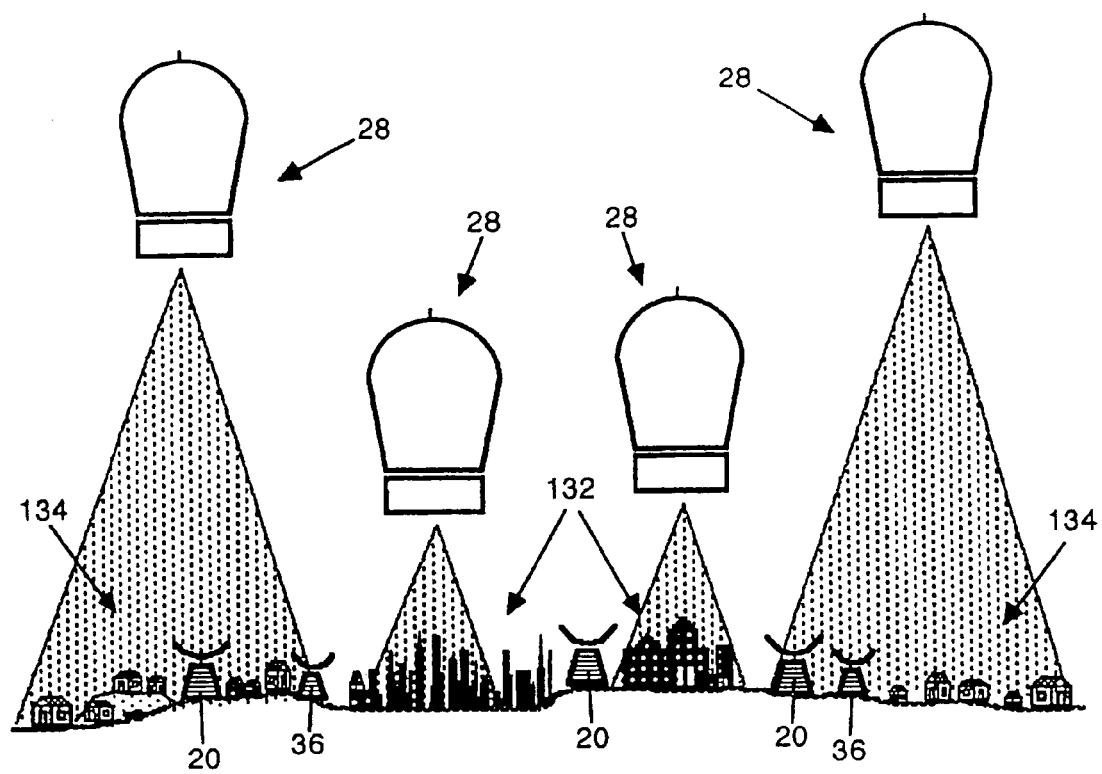
FIG. 7 is a schematic showing an alternate arrangement of the communications system illustrated in FIG. 1.
Figure 7B:
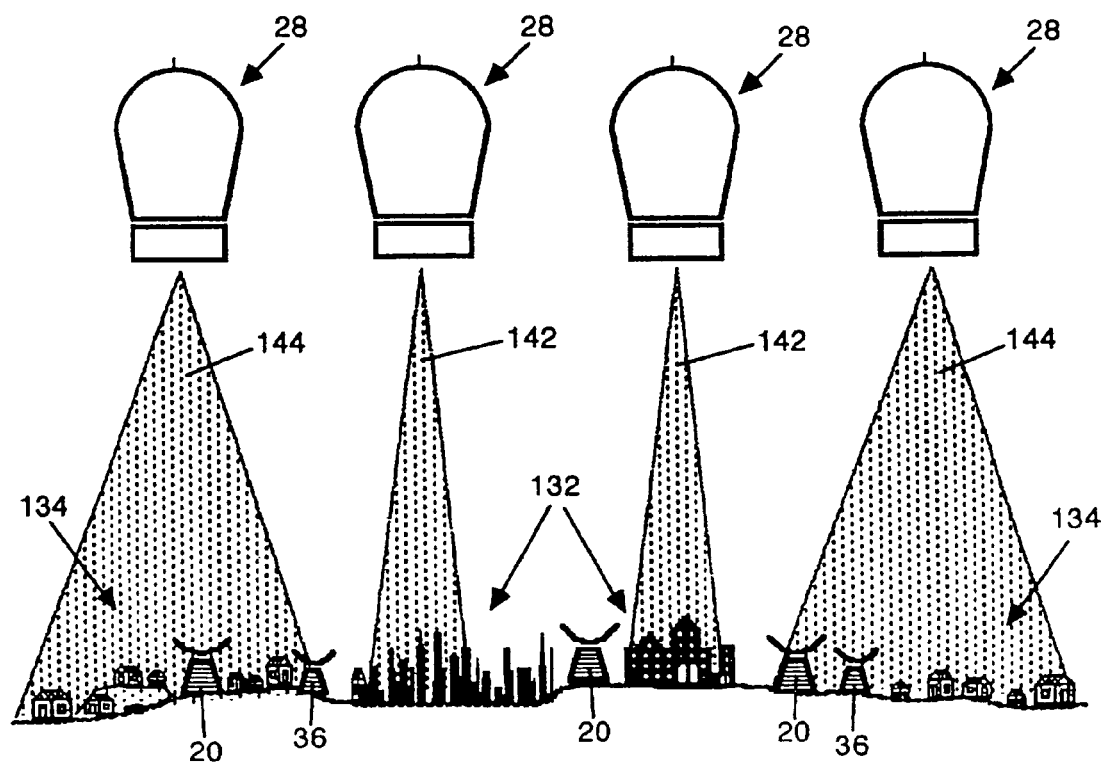

This aspect of the telecommunications system could be enhanced by having the relay stations 28 stationed over more densely populated areas 132 operate at lower altitudes and/or with more narrowly focused angles of reception and propagation 142 than other relay stations 28 that are over less densely populated areas 134 that will operate at higher altitudes and/or with broadly focused angles of reception and propagation 144 as seen in FIGS. 7A and 7B. By doing this, a substantial unbalance in the volume of traffic handled by the various relay stations comprising the telecommunications system can be reduced. Further, as explained earlier, the relay stations 28 that are designated for the more densely populated areas 132 may operate with lower power. This can result in a lower cost of operation. This is another advantage over a satellite based system since in such a system a reduction in the height of the orbit for a particular satellite will increase its decay rate and shorten its life.

As best seen in FIGS. 2, 8, 9 and 10 a recovery system 150 for the relay stations 28 is provided. As will be more fully explained, the recovery system includes a deflation device 152 and a remote controlled recovery parachute 154.

Figure 8:
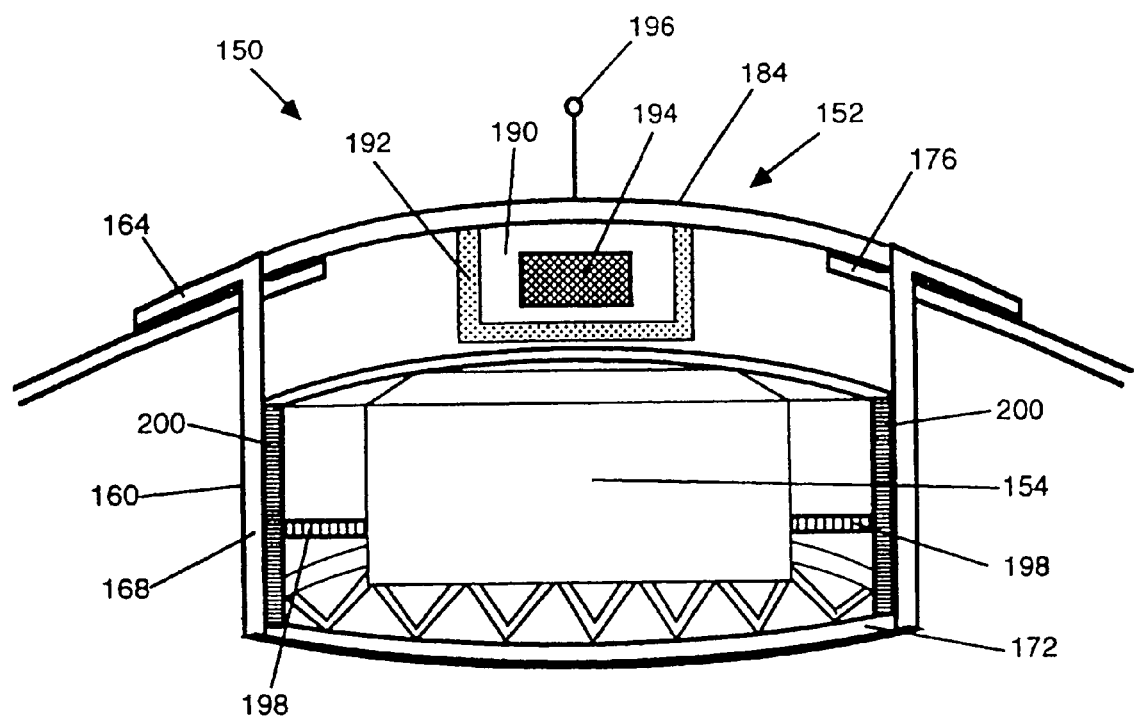
FIG. 8 is a view of a portion of a relay station.

Referring to FIGS. 2 and 8 one embodiment of the deflation device 152 includes a housing 160 that is formed integrally with the suitable lighter than air device 32. The housing 160 includes an outwardly extending and radially directed flange 164 that is integrally connected to the device 32 as by welding or by adhesive. The flange 164 supports a downwardly directed, and generally cylindrical wall 168 that supports a bottom wall 172. As seen in FIG. 8, the bottom wall 172 is defined by an open lattice so that the housing 160 is connected to the interior of the device 32 and is at the same pressure.

Near its upper end the cylindrical wall 168 supports an inwardly directed flange 176. A frangible cover 184 is connected to the flange in airtight relation. This can be accomplished by connecting the cover to the flange by an adhesive, or with a suitable gasket between them, or by fabricating the cover as an integral part of the housing 160.

The cylindrical wall 168, bottom wall 172 and cover 18 define a chamber that contains the remote control recovery parachute 154.

A small chamber 190 is formed on the underside of the cover 184 by a wall 192. A small explosive pack 194 which is contained within the chamber 190 is responsive to a signal received by antenna 196.

The parachute 154 has its control lines 198 connected to a radio controlled drive member 200 that is contained within the housing 160. The drive member 200 may include electric motors that are driven in response to signals from the ground to vary the length of the control lines in a well known manner to thereby provide directional control to the parachute.

To recover the relay station a coded signal is sent to the device where it is received by antenna 196. This results in the explosive charge 194 being detonated and the frangible cover 184 being removed.

Since the cover 184 is designed to break, the explosive charge can be relatively light so that it does not damage the parachute 154.

In this regard the wall 192 helps to direct the explosive force upwardly against the cover rather than toward the device 32.

After the cover has been removed, the gases will begin to escape from the interior of the device 32 through bottom wall 172 and the opening in the top of the housing. The force of air exiting from the device 32 when the cover is first removed will be sufficient to deploy the parachute.

Figure 10:
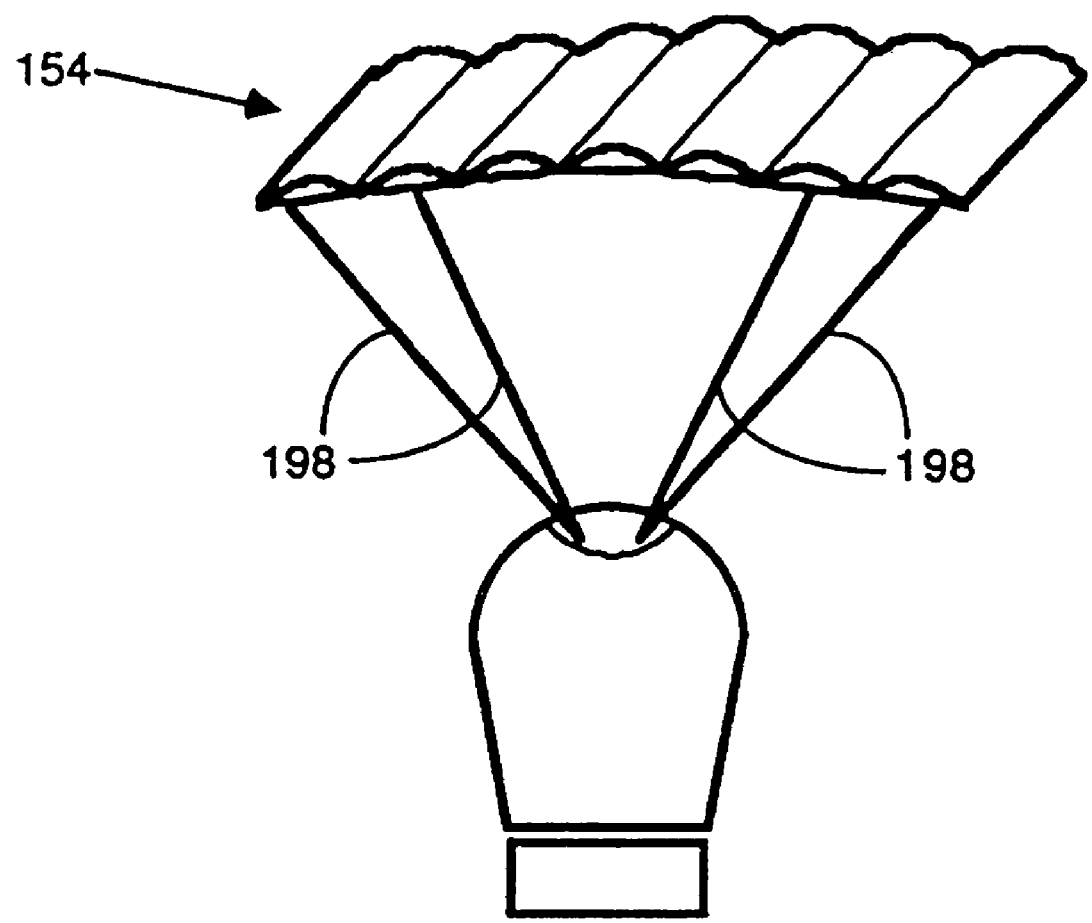
FIG. 10 is a view of a relay station being recovered.

As seen in FIG. 10 the parachute 154 will support the device 32 by way of its control lines 198. As explained above, the relay station 28 can be directed to a predetermined location on the ground.

Figure 9:
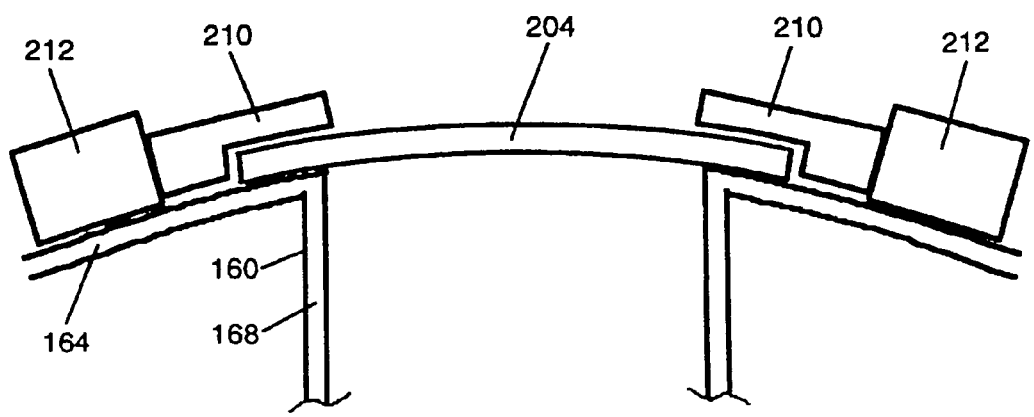
FIG. 9 is a view of a second embodiment of the portion of the relay station shown in FIG. 5.

In the embodiment shown in FIG. 9 flange 164 supports cover 204 with an annular airtight gasket between them. The cover 204 is held against the flange 164 by a plurality of circumferentially spaced clamping brackets 210. The clamping brackets are retractably held in engagement with the cover 204 by electrically driven motors 212. The motors are energized in response to signals from the ground to retract the brackets 210.

When the brackets 210 are retracted, the pressure of the gases escaping from the device 32 will dislodge the cover and permit the parachute to be deployed.

After the relay station has been serviced, the recovery system 150 can be replaced and the device 32 can be re-inflated and returned to their respective stations.

If the relay stations comprise remotely controlled airplanes 114, they can be recovered in a well known manner for service and returned to their respective stations.

While the invention has been described with regard to particular embodiments, it is apparent that other embodiments will be obvious to those skilled in the art in light of the foregoing description. Thus, the scope of the invention should not be limited by the description, but rather, by the scope of the appended claims

The invention claimed is:

1. A telecommunications apparatus comprising at least two ground stations, each of said ground stations including means for sending and receiving telecommunications signals, at least one relay station, said relay station including means for receiving and sending telecommunications signals from and to said ground stations and from and to others of said relay stations, said relay station being at a predetermined altitude that is between about 12 and 35 miles, said relay station being at a fixed predetermined location over the earth for transmitting and receiving telecommunications signals from and to said ground stations and from and to others of said relay stations, means on said relay station for controlling the vertical and lateral movement of said relay station so that said predetermined altitude and fixed predetermined location of said relay station are achieved and maintained for sending and receiving said telecommunications signals to and from said ground stations and said other relay stations.

2. An apparatus as defined in claim 1 wherein said means for controlling the vertical and lateral movement of said relay station so that said predetermined altitude and location of said relay station are achieved and maintained comprises first means, said first means being operative to selectively or simultaneously identify the current altitude or location of said relay station, second means, said second means being operative to selectively or simultaneously identify said predetermined altitude or location for said relay station, and means for moving said relay station from said current altitude or location to said predetermined altitude or location.

3. An apparatus as defined in claim 2 wherein said means for controlling said relay station at said predetermined altitude or location comprises a thrust system, and means for selectively energizing said thrust system.

4. An apparatus as defined in claim 1 wherein said means for controlling the vertical and lateral movement of said relay station so that said predetermined altitude and location of said relay station are achieved and maintained comprises first means, said first means being operative to selectively or simultaneously identify the current altitude and location of said relay station, second means, said second means being operative to selectively or simultaneously identify a predetermined altitude and location for said relay station, and means for moving said relay station from said current altitude and location to said predetermined altitude and/or location.

5. An apparatus as defined in claim 4 wherein said means for controlling said relay station at said predetermined altitude and location comprises a thrust system, and means for selectively energizing said thrust system.

6. An apparatus as defined in claims 3 or 5 wherein said thrust system comprises propellers.

7. An apparatus as defined in claims 3 or 5 wherein said thrust system comprises rockets.

8. An apparatus as defined in claims 3 or 5 wherein said thrust system comprises jets.

9. An apparatus as defined in claims 3 or 5 wherein said means for energizing said thrust system includes means for receiving and converting solar energy to electric energy.

10. An apparatus as defined in claims 3 or 5 wherein said means for energizing said thrust system includes means for receiving and converting wind energy to electric energy.

11. An apparatus as defined in claims 3 or 5 wherein said means for energizing said thrust system includes means for receiving and converting microwave energy to electric energy.

12. An apparatus as defined in claim 11 including at least one ground based microwave transmitter, and means for aiming a microwave beam at said microwave receiving means on said relay station.

13. An apparatus as defined in claim 11 including a second relay station, at least one microwave transmitter based on said second relay station, and means on said second relay station for aiming a microwave beam at said receiving means on said relay station.

14. An apparatus as defined in claims 2 or 4 wherein said relay station is lighter than air.

15. An apparatus as defined in claim 14 wherein said means for controlling said lateral movement comprises a thrust system, and electric means for driving said thrust system.

16. An apparatus as defined in claim 14 wherein said thrust system comprises a plurality of propellers 17. An apparatus as defined in claim 14 wherein said thrust system comprises a plurality of rockets.

18. An apparatus as defined in claim 14 wherein said thrust system comprises a plurality of jets.

19. An apparatus as defined in claim 14 wherein said relay station comprises an inflatable device, and means connected to said inflatable device for deflating it while it is aloft.

20. An apparatus as defined in claim 19 wherein said means for deflating said inflatable device is operative in response to a signal from a remote source.

21. An apparatus as defined in claim 20 wherein said means for deflating said inflatable device includes an opening in said inflatable device, a frangible cover forming part of an inflatable portion of the inflatable device covering and closing said opening and being operative to seal said opening against the escape of gases from said inflatable device, and an explosive charge operative when detonated to remove the frangible cover from said opening.

22. The apparatus according to claim 21, further comprising a housing integral with the inflatable device and disposed within the opening, an interior of the housing communicating with an interior of the inflatable device but being sealed off from the atmosphere by the cover.

23. The apparatus according to claim 22, wherein the housing contains a parachute.

24. The apparatus according to claim 22, wherein the housing contains an explosive material.

25. The apparatus according to claim 24, wherein the housing further contains a shield between the housing and the explosive material, the explosive material between the shield and the cover, the shield configured to direct explosive force generated by the explosive material out through the hole away from the inflatable device.

26. An apparatus as defined in claim 20 wherein said means for deflating said inflatable device includes an opening in said inflatable device, a dislodgeable cover covering and closing said opening against the escape of gases from said inflatable device, and a plurality of clamping brackets for releasably retaining the cover in sealing relation with said opening, at least one electrically driven motor supported by said inflatable device, said electrically driven motor being in engagement with said clamping brackets and being operative when energized to move said clamping brackets so that they release the cover from said opening, air pressure in the inflatable device dislodging the cover upon movement of the clamping brackets.

27. The apparatus according to claim 26, further comprising a housing integral with the inflatable device and disposed within the opening, an interior of the housing communicating with an interior of the inflatable device but being sealed off from the atmosphere by the cover.

28. The apparatus according to claim 27, wherein the housing contains a parachute.

29. The apparatus according to claim 27, wherein the housing contains an explosive material.

30. The apparatus according to claim 29, wherein the housing further contains a shield between the housing and the explosive material, the explosive material between the shield and the cover, the shield configured to direct explosive force generated by the explosive material out through the hole away from the inflatable device.

31. An apparatus in defined in claim 19 wherein said inflatable device includes a parachute having control lines for controlling its descent when it is recovered.

32. An apparatus as defined in claim 31 including means for deploying said parachute, and means for connecting said means for deploying said parachute to said means for deflating said inflatable device so that said parachute is deployed when said inflatable device is deflated.

33. An apparatus as defined in claim 32 including radio controlled means supported by said inflatable device and being connected to the control lines for said parachute, said radio controlled means being operative to provide directional control to said parachute as it descends.

34. An apparatus as defined in claim 19 wherein said relay station comprises a balloon.

35. An apparatus as defined in claim 14 wherein said relay station comprises a super pressure balloon.

36. An apparatus as defined in claim 1 including a ground based telecommunications network, and at least one of said ground stations is connected to said telecommunications network.

37. An apparatus as defined in claim 1 wherein at lease one of said ground stations is mobile.

38. An apparatus as defined in claim 1 wherein at least one of said ground stations is stationary.

39. An apparatus as defined in claim 1 wherein said relay station comprises a balloon.

40. An apparatus as defined in claim 39 wherein said balloon includes means for controlling its altitude.

41. An apparatus as defined in claim 40 wherein said balloon comprises a zero pressure balloon.

42. An apparatus as defined in claim 40 wherein said balloon comprises an overpressure zero pressure balloon.

43. An apparatus as defined in claim 42 wherein said balloon comprises a zero pressure balloon.

44. An apparatus as defined in claim 42 wherein said balloon comprises an overpressure zero pressure balloon.

45. An apparatus as defined in claim 39 wherein said balloon comprises a super pressure balloon.

46. An apparatus as defined in claim 39 wherein said balloon includes means for controlling the temperature of the gas that it contains.

47. An apparatus as defined in claim 39 wherein said balloon includes a skin, and at least a portion of said skin is comprised of electro-chromatic material.

48. An apparatus as defined in claim 39 wherein said balloon includes a skin, and at least a portion of said skin is comprised of photochromatic material.

49. An apparatus as defined in claim 48 wherein said balloon comprises a zero pressure balloon.

50. An apparatus as defined in claim 48 wherein said balloon comprises an overpressure zero pressure balloon.

51. An apparatus as defined in claim 1 wherein at least one of the relay stations comprise a plurality of sections each supported by a separate balloon, at least one of said sections including means for selectively receiving and sending telecommunications signals from and to said ground stations and/or others of said relay stations, and at least one of said sections including means for providing energy for said means for receiving and sending telecommunications signals and/or said means for controlling the lateral and vertical movement of said relay stations.

52. An apparatus as defined in claim 51 wherein at least two of said sections include means for selectively receiving and sending telecommunications signals from and to said ground stations and/or others of said relay stations, so that if said last named means on one of said sections fails, the other section will continue to operate and thereby keep the relay station in service.

53. An apparatus as defined in claim 51 wherein at least two of said sections include means for providing energy for said means for receiving and sending telecommunications signals and/or said means for controlling the lateral and vertical movement of said relay stations, so that if said last named means on one of said sections fails, the other section will continue to operate and thereby keep the relay station in service.

54. An apparatus as defined in claim 51 wherein said means for providing energy includes means for receiving microwave energy and converting it to electric energy.

55. An apparatus as defined in claim 54 wherein said means for receiving microwave energy includes means for collecting microwave energy from space.

56. An apparatus as defined in claim 54 including at least one ground microwave transmitter, and said means for receiving microwave energy receives microwave energy from said ground microwave transmitter.

57. An apparatus as defined in claim 51 wherein said means for providing energy includes means for converting solar energy to microwave energy and transmitting it to said means for receiving microwave energy.

58. An apparatus as defined in claim 57 wherein said airplane includes means for providing energy for said means for receiving and sending telecommunications signals and/or said means for controlling the lateral and vertical movement of said relay stations.

59. An apparatus as defined in claim 58 wherein said means for providing energy includes means for receiving microwave energy and converting it to electric energy.

60. An apparatus as defined in claim 59 including at least one ground microwave transmitter, and said means for receiving microwave energy receives microwave energy from said ground microwave transmitter.

61. An apparatus as defined in claim 58 wherein said means for providing energy includes means for converting solar energy to microwave energy and transmitting it to said means for receiving microwave energy.

62. An apparatus as defined in claim 58 wherein said means for providing energy includes means for converting chemical energy to microwave energy and transmitting it to said means for receiving microwave energy.

63. An apparatus as defined in claim 58 wherein said means for providing energy includes means for converting wind energy to microwave energy and transmitting it to said means for receiving microwave energy.

64. An apparatus as defined in claim 58 wherein said means for receiving microwave energy includes means for collecting microwave energy from space.

65. An apparatus as defined in claim 51 wherein said means for providing energy includes means for converting chemical energy to microwave energy and transmitting it to said means for receiving microwave energy.

66. An apparatus as defined in claim 51 wherein said means for providing energy includes means for converting wind energy to microwave energy and transmitting it to said means for receiving microwave energy.

67. An apparatus as defined in claim 1 wherein said relay station comprises a light weight airplane.

68. An apparatus as defined in claim 1 wherein said means for selectively receiving and sending telecommunications signals from and to said ground stations and/or others of said relay stations operates at frequencies that are the same as those allocated to terrestrial telecommunications.

69. An apparatus as defined in claim 68 wherein the use of said frequencies is increased by digital multiple access technologies.

70. An apparatus as defined in claim 1 wherein there are a plurality of relay stations, and relay stations stationed over more densely populated areas are lower than relay stations stationed over less densely populated areas.

71. An apparatus as defined in claim 70 wherein said lower relay stations require less power for their telecommunications signals than said higher relay stations.

72. An apparatus as defined in claim 1 wherein there are a plurality of relay stations, the relay stations over more densely populated areas have a narrow focus for the angle of reception and propagation of telecommunications signals, and the relay stations over less densely populated areas have a broad focus for the angle of reception and propagation of telecommunications signals.

73. An apparatus as defined in claim 72 wherein said relay stations whose angles of reception and propagation are narrow require less power for their telecommunications signals than said relay stations whose angles of reception and propagation are broad.

74. A telecommunications method comprising the steps of providing at least two ground stations and at least one relay station, positioning said relay station at a fixed predetermined location over the earth and at a predetermined altitude for receiving and transmitting telecommunications signals to and from said ground stations and other relay stations, said predetermined altitude being between about 12 and 35 miles, transmitting a telecommunications signal from a first one of said ground stations to said relay station, receiving said telecommunications signal at said relay station and transmitting said signal to a second ground station, and maintaining said relay station at said fixed predetermined altitude and location for sending and receiving said telecommunications signals to and from said ground stations and said other relay stations.

75. A method as defined in claim 74 including the steps of identifying a current altitude and location over the earth of said relay station, identifying a predetermined altitude and location for said relay station, and moving said relay station from said current altitude and/or location to said predetermined altitude and location.

76. A method as defined in claim 74 including the steps of identifying a current altitude or location over the earth of said relay station, identifying said predetermined altitude or location for said relay station, and moving said relay station from said current altitude or location to said predetermined altitude or location.

77. A method as defined in claims 75 or 76 wherein the step of moving said relay station includes the step of applying a thrust force to said relay station in the direction in which it is to move.

78. A method as defined in claim 77 including the step of enabling said relay stations to receive and store energy, and using said energy to create said thrust force and to enable said relay station to transmit and receive telecommunications signals.

79. A method as defined in claim 78 wherein said relay stations can receive and store solar energy.

80. A method as defined in claim 78 wherein said relay stations can receive and store microwave energy.

81. A method as defined in claim 78 wherein said relay stations can receive and store wind energy.

82. A method as defined in claim 78 wherein said energy is chemical energy.

83. A method as defined in claim 75 or 76 including the step of returning said relay station to a predetermined location on the earth.

84. A method as defined in claim 74 wherein at least one of said ground stations is mobile.

85. A method as defined in claim 74 wherein said relay station is lighter than air.

86. A method as defined in claim 85 wherein said relay station is inflated with a gas.

87. A method as defined in claim 85 including the step of controlling the altitude of said relay station.

88. A method as defined in claim 87 wherein said step of controlling the altitude of said relay station includes controlling the temperature of said gas.

89. A method as defined in claim 88 wherein the temperature of said gas is controlled by controlling the amount of solar radiant energy that enters said balloon.

90. A method as defined in claim 89 wherein said step of controlling the amount of solar energy that enters said balloon includes the step of changing the transparency of the skin of said balloon.

91. A method as defined in claim 90 wherein at least a portion of said skin is comprised of electro-chromatic material.

92. A method as defined in claim 91 wherein said balloon comprises a zero pressure balloon.

93. A method as defined in claim 91 wherein said balloon comprises an overpressure zero pressure balloon.

94. A method as defined in claim 90 wherein said balloon includes a skin, and at least a portion of said skin is comprised of photochromatic material.

95. A method as defined in claim 94 wherein said balloon comprises a zero pressure balloon.

96. A method as defined in claim 94 wherein said balloon comprises an overpressure zero pressure balloon.

97. A method as defined in claim 74 wherein the step of providing a relay station includes the step of providing it with a plurality of sections each supported by a separate balloon, selectively receiving and sending telecommunications signals from and to said ground stations and/or other relay stations by at least one of said sections, transmitting energy to said last named section from at least one of said other sections, and said energy is operative to enable said telecommunications.

98. A method as defined in claim 97 wherein the step of receiving and sending telecommunications signals from and to said ground stations and/or other relay stations is by at least two of said sections so that if there is a failure of the ability to send and/or receive telecommunications signals from or to one of said sections, the other section will continue to operate and thereby keep the relay station in service.

99. A method as defined in claim 97 wherein the step of transmitting energy to said section that selectively receives and sends telecommunications signals from and to said ground stations and/or other relay stations includes the step of transmitting energy by at least two of said sections so that if there is a failure of the ability to transmitting energy from one of said sections, the other section will continue to operate and thereby keep the relay station in service.

100. A method as defined in claim 97 wherein said energy that is transmitted is microwave energy, converting said microwave energy to electric energy, and using said electric energy for said telecommunication.

101. A method as defined in claim 97 wherein said step of transmitting energy to said last named section includes the steps of collecting solar energy at said other section, converting said solar energy to microwave energy, and transmitting said microwave energy.

102. A method as defined in claim 97 wherein said step of transmitting energy to said last named section includes the steps of collecting wind energy at said other section, converting said wind energy to microwave energy, and transmitting said microwave energy.

103. A method as defined in claim 97 wherein said step of transmitting energy to said last named section includes the steps of providing chemical energy at said other section, converting said chemical energy to microwave energy, and transmitting said microwave energy.

104. A method as defined in claim 97 wherein said step of transmitting energy to said last named section includes the steps of collecting microwave energy at said other section, and transmitting said microwave energy.

105. A method as defined in claim 74 wherein said telecommunications signals are at the same frequencies as those allocated to terrestrial telecommunications signals.

106. A method as defined in claim 105 including the step of increasing the number of channels available for communication on said frequencies by digital multiple access technologies.

107. A method as defined in claim 106 wherein said digital multiple access technology includes TDMA.

108. A method as defined in claim 106 wherein said digital multiple access technology includes FDMA.

109. A method as defined in claim 106 wherein said digital multiple access technology includes CDMA.

110. A method as defined in claim 74 including the step of providing a plurality of relay stations, locating relay stations stationed over more densely populated areas at lower altitudes than relay stations located over less densely populated areas.

111. A method as defined in claim 110 wherein said relay stations at lower altitudes require less power for telecommunications signals than said higher relay stations.

112. A method as defined in claim 74 including the step of providing a plurality of relay stations, providing a narrow focus for the angle of reception and propagation of telecommunications signals for those relay stations over more densely populated areas, and providing a broad focus for the angle of reception and propagation of telecommunications signals for those relay stations over less densely populated areas.

113. A method as defined in claim 112 including the steps of providing said relay stations whose angles of reception and propagation are narrow with less power for their telecommunications signals than said relay stations whose angles of reception and propagation are broad.

114. A method as defined in claim 74 wherein said relay station is lighter than air.

115. A method as defined in claim 114 wherein said relay station is inflatable.

116. A method as in claim 115 wherein said relay station is a super pressure balloon.

117. A method as in claim 114 wherein said relay station is a super pressure balloon.

118. A method as defined in claim 74 wherein the step of transmitting said telecommunications signal to said second ground station includes the steps of providing a second relay station, transmitting said telecommunications signal from said first relay station to said second relay station, and transmitting said telecommunications signal from said second relay station to said second ground station.

119. A method as defined in claim 74 wherein the step of transmitting said signal to said second ground station includes the steps of providing a second relay station, transmitting said communications signal from said first relay station to said second relay station, and transmitting said communications signal from said second relay station to said second ground station.

120. A telecommunications apparatus comprising at least two ground stations, each of said ground stations including means for sending and receiving telecommunications signals, at least one relay station, said relay station including means for receiving and sending telecommunications signals from and to said ground stations and from and to others of said relay stations, first means for identifying the current altitude and location of said relay station, second means for identifying a predetermined altitude and a fixed predetermined location over the earth for said relay station, said predetermined altitude being between about 12 to 35 miles, and means on said relay station for moving said relay station from said current altitude and location to said predetermined altitude and fixed predetermined location over the earth for sending and receiving signals to and from said ground stations and said other relay stations.

121. An apparatus as defined in claim 120 wherein said means for controlling said relay station at said predetermined altitude and location comprises a thrust system, said thrust system comprises a plurality of elements, and means for selectively energizing selected ones of said plurality of elements so that the direction in which said relay station moves is controlled.

122. An apparatus as defined in claims 120 or 121 wherein said relay station is lighter than air.

123. An apparatus as defined in claim 122 wherein said means for controlling said lateral movement comprises a thrust system, and electric means for driving said thrust system.

124. An apparatus as defined in claim 123 wherein said thrust system comprises a plurality of propellers.

125. An apparatus as defined in claim 123 wherein said thrust system comprises a plurality of rockets.

126. An apparatus as defined in claim 123 wherein said thrust system comprises a plurality of jets.

127. An apparatus as defined in claim 122 wherein said relay station is a super pressure balloon.

128. An apparatus as defined in claim 122 wherein said relay station comprises an inflatable device, and means connected to said inflatable device for deflating it while it is aloft.

129. An apparatus as defined in claim 128 wherein said means for deflating said inflatable device is operative in response to a signal from a remote source.

130. An apparatus as defined in claim 129 wherein said means for deflating said inflatable device includes an opening in said inflatable device, a frangible cover forming part of an inflatable portion of the inflatable device covering and closing said opening and being operative to seal said opening against the escape of gases from said inflatable device, and an explosive charge operative when detonated to remove the frangible cover from said opening.

131. The apparatus according to claim 130, further comprising a housing integral with the inflatable device and disposed within the opening, an interior of the housing communicating with an interior of the inflatable device but being sealed off from the atmosphere by the cover.

132. The apparatus according to claim 131, wherein the housing contains a parachute.

133. The apparatus according to claim 131, wherein the housing contains an explosive material.

134. The apparatus according to claim 133, wherein the housing further contains a shield between the housing and the explosive material, the explosive material between the shield and the cover, the shield configured to direct explosive force generated by the explosive material out through the hole away from the inflatable device.

135. An apparatus as defined in claim 129 wherein said means for deflating said inflatable device includes an opening in said inflatable device, a dislodgeable cover covering and closing said opening against the escape of gases from said inflatable device, and a plurality of clamping brackets for releasably retaining the cover in sealing relation with said opening, at least one electrically driven motor supported by said inflatable device, said electrically driven motor being in engagement with said clamping brackets and being operative when energized to move said clamping brackets so that they release the cover from said opening, air pressure in the inflatable device dislodging the cover upon movement of the clamping brackets.

136. The apparatus according to claim 135, further comprising a housing integral with the inflatable device and disposed within the opening, an interior of the housing communicating with an interior of the inflatable device but being sealed off from the atmosphere by the cover.

137. The apparatus according to claim 136, wherein the housing contains a parachute.

138. The apparatus according to claim 136, wherein the housing contains an explosive material.

139. The apparatus according to claim 138, wherein the housing further contains a shield between the housing and the explosive material, the explosive material between the shield and the cover, the shield configured to direct explosive force generated by the explosive material out through the hole away from the inflatable device.

140. An apparatus in defined in claim 128 wherein said inflatable device includes a parachute having control lines for controlling its descent when it is recovered.

141. An apparatus as defined in claim 140 including means for deploying said parachute, and means for connecting said means for deploying said parachute to said means for deflating said inflatable device so that said parachute is deployed when said inflatable device is deflated.

142. An apparatus as defined in claim 141 including radio controlled means supported by said inflatable device and being connected to the control lines for said parachute, said radio controlled means being operative to provide directional control to said parachute as it descends.

143. An apparatus as defined in claim 128 wherein said relay station is a super pressure balloon.

144. A telecommunications apparatus comprising at least two ground stations, each of said ground stations including means for sending and receiving telecommunications signals, at least one relay station, said relay station including means for receiving and sending telecommunications signals from and to said ground stations and from and to others of said relay stations, first means for identifying the current altitude or location of said relay station, second means for identifying a predetermined altitude or a fixed predetermined location over the earth for said relay station, said predetermined altitude being between about 12 to 35 miles, and means on said relay station for moving said relay station from said current altitude and location to said predetermined altitude or fixed predetermined location over the earth for sending and receiving signals to and from said ground stations and said other relay stations.

145. An apparatus as defined in claim 144 wherein said means for controlling said relay station at said predetermined altitude or location comprises a thrust system, said thrust system comprises a plurality of elements, and means for selectively energizing selected ones of said plurality of elements so that the direction in which said relay station moves is controlled.

146. An apparatus as defined in claims 121 or 145 wherein said thrust system comprises propellers.

147. An apparatus as defined in claims 121 or 145 wherein said thrust system comprises rockets.

148. An apparatus as defined in claims 121 or 145 wherein said thrust system comprises jets.

149. An apparatus as defined in claim 121 or 145 wherein said means for energizing said thrust system includes means for receiving and converting solar energy to electric energy.

150. An apparatus as defined in claim 121 or 145 wherein said means for energizing said thrust system includes means for receiving and converting wind energy to electric energy.

151. An apparatus as defined in claim 121 or 145 wherein said means for energizing said thrust system includes means for receiving and converting microwave energy to electric energy.

152. An apparatus as defined in claim 151 including at least one ground based microwave transmitter, and means for aiming a microwave beam from said transmitter at said microwave receiving means on said relay station.

153. An apparatus as defined in claim 151 including a second relay station, at least one microwave transmitter based on said second relay station, and means on said second relay station for aiming a microwave beam from said transmitter at said microwave receiving means on said relay station.

154. An apparatus as defined in claims 120 or 144 including a ground based telecommunications network, and at least one of said ground stations is connected to said telecommunications network.

155. An apparatus as defined in claim 120 or 144 wherein at least one of said ground stations is mobile.

156. An apparatus as defined in claim 120 or 144 wherein at least one of said ground stations is stationary.

157. A relay station for a high altitude sub-orbital telecommunications system which is to be disposed at a predetermined altitude of between about 12 to 35 miles and at a fixed predetermined location over the earth comprising means for receiving and sending telecommunications signals from and to ground stations and from and to other relay stations, and means for controlling the vertical and lateral movement of said relay station so that said predetermined altitude and said fixed predetermined location of said relay station is achieved and maintained for sending and receiving said telecommunications signals to and from said ground stations and said other relay stations.

158. The relay station as defined in claim 157 wherein said means for maintaining said relay station at said predetermined altitude and location comprises a thrust system, and means for energizing said thrust system.

159. The relay station as defined in claim 158 wherein said means for controlling the lateral and vertical movement of said relay station so that a predetermined altitude and location of said relay station is achieved and maintained comprises first means for identifying the current altitude or location of said relay station, and second means for identifying a predetermined altitude or location for said relay station, and an energizable thrust system on said relay station, said thrust system being selectively operative to move said relay station from its current altitude or location to said predetermined altitude or location.

160. The relay station as defined in claim 157 wherein said means for controlling the lateral and vertical movement of said relay station so that a predetermined altitude and location of said relay station is achieved and maintained comprises first means for identifying the current altitude and location of said relay station, and second means for identifying a predetermined altitude and location for said relay station, and an energizable thrust system on said relay station, said thrust system being selectively operative to move said relay station from its current altitude and location to said predetermined altitude and location.

161. The relay station as defined in claim 160 or 159 wherein said thrust system comprises propellers.

162. The relay station as defined in claim 160 or 159 wherein said thrust system comprises rockets.

163. The relay station as defined in claim 160 or 159 wherein said thrust system comprises jets.

164. The relay station as defined in claim 160 or 159 wherein said means for energizing said thrust system includes means for receiving and converting solar energy to electric energy.

165. The relay station as defined in claim 160 or 159 wherein said means for energizing said thrust system includes means for receiving and converting wind energy to electric energy.

166. The relay station as defined in claim 160 or 159 wherein said means for energizing said thrust system includes means for receiving and converting microwave energy to electric energy.

167. The relay station as defined in claim 166 including at least one ground based microwave transmitter, and means for aiming a microwave beam at said microwave receiving means on said relay station.

168. The relay station as defined in claim 167 including at least one microwave transmitter based on said relay station, and means on said relay station for aiming a microwave beam at said receiving means on another relay station.

169. The relay station as defined in claim 157 wherein said relay station comprises a balloon.

170. The relay station as defined in claim 169 wherein said balloon includes means for controlling the temperature of the gas that it contains.

171. The relay station as defined in claim 170 wherein said balloon includes a skin, and at least a portion of said skin is comprised of electro-chromatic material.

172. The relay station as defined in claim 171 wherein said balloon comprises a zero pressure balloon.

173. The relay station as defined in claim 172 wherein said balloon includes a skin, and at least a portion of said skin is comprised of photochromatic material.

174. The relay station as defined in claim 173 wherein said balloon comprises an overpressure zero pressure balloon.

175. The relay station as defined in claim 171 wherein said balloon comprises an overpressure zero pressure balloon.

176. The relay station as defined in claim 175 wherein said balloon comprises a zero pressure balloon.

177. The relay station as defined in claim 169 wherein said balloon includes means for controlling its altitude.

178. The relay station as defined in claim 177 wherein said balloon comprises a zero pressure balloon.

179. The relay station as defined in claim 177 wherein said balloon comprises an overpressure zero pressure balloon.

180. The relay station as defined in claim 179 wherein said balloon comprises a super pressure balloon.

181. The relay station as defined in claim 157 wherein said relay station is lighter than air.

182. The relay station as defined in claim 181 wherein said means for controlling said lateral movement comprises a thrust system, and electric means for driving said thrust system.

183. The relay station as defined in claim 181 wherein said thrust system comprises a plurality of propellers.

184. The relay station as defined in claim 181 wherein said thrust system comprises a plurality of rockets.

185. The relay station as defined in claim 181 wherein said thrust system comprises a plurality of jets.

186. The relay station as defined in claim 181 wherein said relay station comprises an inflatable device, and means connected to said inflatable device for deflating it while it is aloft.

187. The relay station as defined in claim 186 wherein said means for deflating said inflatable devices is operative in response to a signal from a remote source.

188. The relay station as defined in claim 187 wherein said means for deflating said inflatable device includes an opening in said inflatable device, a cover closing said opening and being operative to seal said opening against the escape of gases from said inflatable device, and an explosive charge connected to said cover, said explosive charge being operative when detonated to remove said cover from said opening.

189. The relay station as defined in claim 187 wherein said means for deflating said inflatable device includes an opening in said inflatable device, a cover closing said opening against the escape of gases from said inflatable device, and a plurality of clamping brackets for releasably retaining said cover in sealing relation with said opening, at least one electrically driven motor supported by said inflatable device, said electrically driven motor being in engagement with said clamping brackets and being operative when energized to move said clamping brackets so that they release said cover from said opening, air pressure in the inflatable device dislodging the cover upon movement of the clamping brackets.

190. The apparatus according to claim 189, further comprising a housing integral with the inflatable device and disposed within the opening, an interior of the housing communicating with an interior of the inflatable device but being sealed off from the atmosphere by the cover.

191. The apparatus according to claim 190, wherein the housing contains a parachute.

192. The apparatus according to claim 190, wherein the housing contains an explosive material.

193. The apparatus according to claim 192, wherein the housing further contains a shield between the housing and the explosive material, the explosive material between the shield and the cover, the shield configured to direct explosive force generated by the explosive material out through the hole away from the inflatable device.

194. The relay station in defined in claim 186 wherein said inflatable device includes a parachute for controlling its descent when it is recovered.

195. The relay station as defined in claim 194 including means for deploying said parachute, and means for connecting said means for deploying said parachute to said means for deflating said inflatable device so that said parachute is deployed when said inflatable device is deflated.

196. The relay station as defined in claim 194 including radio controlled means supported by said inflatable device and being connected to the control lines for said parachute, and said radio controlled means is operative to provide directional control to said parachute as it descends.

* * * * *

UNITED STATES PATENT AND TRADEMARK OFFICE
CERTIFICATE OF CORRECTION

PATENT NO. : 7,567,779 B2  Page 1 of 1
APPLICATION NO. : 11/228144
DATED : July 28, 2009
INVENTOR(S) : Seligsohn et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by 128 days Delete the phrase "by 128 days" and insert -- by 409 days --

Signed and Sealed this

Twenty-seventh Day of July, 2010

David J. Kappos
*Director of the United States Patent and Trademark Office*